Figure 1:
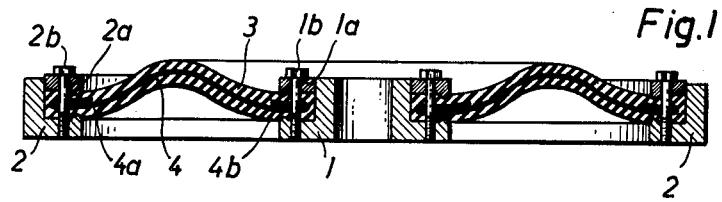

Sept. 21, 1965   B. HACKFORTH   3,207,539
FLEXIBLE COUPLINGS
Filed Aug. 9, 1961

Bernhard Hackforth
INVENTOR

BY:
Mestern, Ross & Mestern

United States Patent Office 3,207,539
Patented Sept. 21, 1965

3,207,539
FLEXIBLE COUPLINGS
Bernhard Hackforth, Heerstrasse 52/58,
Wanne-Eickel, Germany
Filed Aug. 9, 1961, Ser. No. 130,410
Claims priority, application Germany, Aug. 11, 1960,
H 40186
3 Claims. (Cl. 287—85)

Flexible couplings for shafts and the like are known wherein the rigid parts of the coupling are situated one inside the other in a substantially coaxially or radially spaced relationship and are connected by an annular coupling element of elastically deformable material, which is fastened on the rigid parts of the coupling along its outer and inner peripheries. These coupling elements of annular shape (which shape may be extended to form a complete disc, here regarded as annular) may be curved on one side and may also be thickened towards the inner edge so that the surfaces taking the forces acting on the inner and outer edges of the coupling element are equal to one another as far as possible. The coupling element may be fastened on the rigid parts of the coupling by vulcanization, by clamping edge zones of the coupling element with the aid of rigid clamping rings, or by means of a number of pins, e.g. bolts, which hold the coupling element at spaced locations only.

A reinforcing inlay, consisting for example of woven textile, woven plastic or woven wire, may be embedded in the coupling element, but the life of the latter is still unduly limited, this life being the shorter the higher the forces that are to be transmitted and the more nonuniform the action of these forces upon the element and its reinforcement. Experience has shown that partial damage of a coupling element occurs first of all at the connections to the rigid coupling parts or in the immediate vicinity of these connections. This is particularly the case if the coupling element is held on the rigid coupling parts only or substantially only by pins, because in that case the parts of the coupling element situated between the fastening points can yield under the tensile stresses occurring during operation and consequently do not participate as actively in the power transmission as those parts situated in the immediate region of the connections. This yielding process may occur even with clamped connections if the edges of the coupling element are not clamped sufficiently firmly over their entire periphery. It is obvious that a conventional reinforcing inlay, which must naturally participate in the elastic deformations of the coupling element during operation, is not able to prevent this yielding of the edge zones or even appreciably to attenuate it. Furthermore, my research has shown that very early local damage occurs to the resilient coupling elements if the reinforcing inlay does not extend to the immediate vicinity of the edges of the coupling elements and consequently is not engaged sufficiently by the clamp parts or if the pins passing through the coupling elements do not pass through the inlay at all or else pass through it at a region too close to the edge. The inlay frequently terminating at a fairly considerable distance from the edges of the coupling element at a relatively large number of places by reason of the fact that, during the molding of the raw material for the elastically deformable coupling element, the inlay embedded therein moves out of position and this movement is not observed and cannot be prevented during the molding operation.

According to the present invention, the reinforcing inlay is folded over near the outer and inner edges of the coupling element so as to double the edge zones of the inlay. Such a folding over of the inlay, effected prior to a molding operation employed to make the coupling element, gives the inlay a more stable shape than hitherto, and the thickening formed as a result of the doubling prevents the inlay from being pulled away from the edge of the coupling element during its embedding in the elastically deformable material.

Preferably the doubled-edge marginal zones of the sheet-like reinforcing inlay each enclose a reinforcing ring (e.g. of wire or stranded wire) disposed inside the coupling element at a slight distance from the respective edge thereof. These rings are even more effective than the double-edge zones of the inlay is preventing any yielding of parts of the coupling element situated outside the fastening points, and transmit the forces acting upon the fastening points to the parts situated beyond the fastening points. All the parts of the coupling element are therefore subjected to more uniform stresses and to correspondingly smaller stresses at the points of action of the force.

If, during the assembly of the coupling, care is taken to ensure that the clamping parts engage over these rings enclosed by the reinforcing inlay or that fastening pins pass through the inlay near the ring, the result is a coupling in which the life of the resilient ring depends practically only on the aging of the elastically deformable material. At the same time, couplings may be made which are suitable for the transmission of nonuniform forces and also of much greater forces than known couplings of similar dimensions.

The increase in the shape stability of the reinforcing inlay by folding over the edge zones also enables a number of such inlays, for example two, to be disposed inside the elastically deformable material. These two reinforcing inlays may each enclose a reinforcing ring both at the inner periphery and at the outer periphery or alternatively at least the edge zones of the two reinforcing inlays adjacent one edge (either inner or outer) of the coupling element may be folded over in opposite directions around a common ring disposed near the edge concerned. In this case, the wall thickness of the coupling element may be made smaller than when use is made of two spaced-apart reinforcing inlays disposed one above the other in the axial direction. In the case of coupling elements which are thickened towards one edge, two inlays may be folded over a common ring at the thinner edge and around a respective one of two axially spaced rings at the thicker edge.

Five different flexible couplings according to the invention are shown in the accompanying drawing, FIGURES 1 to 5 being respective axial sections of the five couplings.

In the embodiment shown in FIGURE 1, the inner rigid coupling ring 1 and the outer rigid coupling ring 2 are connected together by an annular coupling element 3 of elastically deformable material, for example rubber. This element is connected at its inner edge by a clamping ring 1a and bolts 1b to the coupling part 1 and at its outer edge by a clamping ring 2a and bolts 2b to the outer coupling ring 2. The reinforcing inlay 4, wholly embedded in the resilient material, is folded over at its outer and inner edges so as to form doubled-edge zones 4a and 4b through which the bolts 1b and 2b pass.

Figure 2:
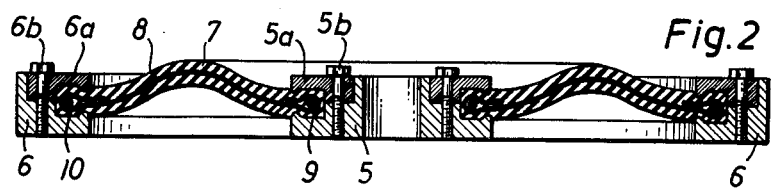

In the embodiment of FIGURE 2, the inner rigid coupling part 5 and the outer rigid coupling part 6 are connected by an annular resilient coupling element 7. Here, the connection is established by clamping rings 5a and 6a which, however, are clamped to the coupling parts 5 and 6 by means of bolts 5b and 6b disposed outside the coupling element 7. The inner and outer edges of the reinforcing inlay are each folded over a ring 9 and 10 respectively arranged near the edges of the coupling element 7. The edge strips of the inlay 8 folded over these rings 9 and 10 extend into the interior of the coupling element 7 to an extent such that the pressure from the clamping rings 6a and 5a still acts upon them in such manner that the reinforcing inlays transmit the power not only by rubber adhesion but also by contact pressure.

Figure 3:
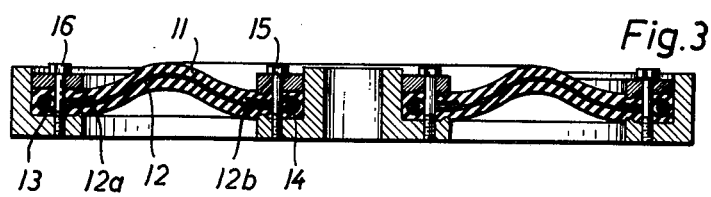

In the flexible coupling according to FIGURE 3, reinforcing rings 13 and 14 are situated inside the double-edge zones 12a and 12b. The bolts 15, 16 pass through the doubled zones 12a, 12b immediately adjacent the rings 13, 14.

Figure 4:
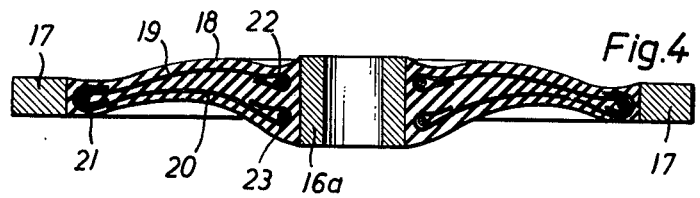

FIGURE 4 shows a flexible coupling wherein the flexible annular coupling element 18 is connected to the rigid coupling parts 16a, 17 by vulcanization. Two reinforcing inlays 19, 20 are situated in spaced relationship inside the element 18. At the outer edge of the element 18 these inlays are passed in opposite directions around a common reinforcing ring 21 while at the inner edge of the coupling element 18 they are each folded over a respective one of two reinforcing rings 22, 23.

Figure 5:
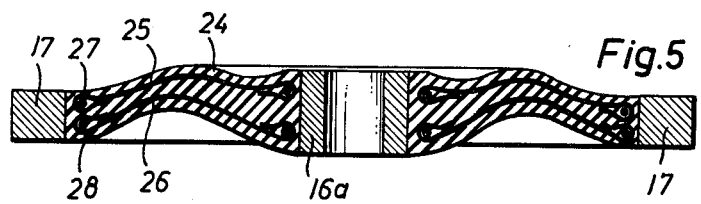

The embodiment shown in FIGURE 5 differs from that shown in FIGURE 4 only in that in this case, the two inlays 25 and 26 are each folded over a reinforcing ring 27 and 28 respectively at the outer edge of the coupling element 24 as well.

I claim:

1. A flexible coupling for shafts and the like, comprising two radially spaced rigid coupling members; an annular coupling element bridging said members while having inner and outer peripheries respectively secured to said members, thereby flexibly connecting them together, said element comprising a body of elastically deformable material and an annular reinforcing inlay of woven sheet material wholly embedded in said body and spanning said members while extending close to said peripheries within said body, said inlay having inwardly turned annular marginal portions of said sheet material along said inner and outer peripheries of said element, thereby reinforcing said inlay with outer and inner edge zones having twice the thickness of said sheet material; a first reinforcing ring embedded in said body inwardly of the outer periphery of said element along the outer edge zone of said inlay with the respective marginal portion thereof turned around said ring over the entire circumference thereof; and at least one second reinforcing ring embedded in said body inwardly of the inner periphery of said element along the inner edge zone of said inlay with the respective marginal portion turned around said second ring over the entire circumference thereof, said element being provided with a second reinforcing inlay extending generally parallel to the first-mentioned inlay and composed of woven sheet material while being wholly embedded in said body and spanning said members, said second inlay having inwardly turned annular marginal portions of said sheet material along said inner and outer peripheries of said element, thereby reinforcing said second inlay with outer and inner edge zones, said element further comprising a third ring embedded in said body inwardly of one of the peripheries of said element, one of the marginal portions of said second inlay being turned around said third ring.

2. A coupling as defined in claim 1 wherein the other marginal portion of said second inlay is turned around one of said first and second rings along the entire circumference thereof.

3. A coupling as defined in claim 2 wherein said other marginal portion of said second inlay is turned around said one of said rings in the direction opposite to that which the respective marginal portion of said first inlay is turned therearound.

References Cited by the Examiner

UNITED STATES PATENTS

| 1,604,925 | 10/26 | Macdonald | 64—13 |
| 2,142,784 | 1/39 | Guy | 64—11 |
| 2,655,195 | 10/53 | Curtis | 74—237 X |
| 2,755,214 | 7/56 | Lyons. | |
| 2,792,868 | 5/57 | Benson | 74—232 X |

FOREIGN PATENTS

| 225,647 | 11/59 | Australia. |
| 842,878 | 7/52 | Germany. |
| 574,468 | 1/46 | Great Britain. |
| 282,817 | 8/52 | Switzerland. |

CARL W. TOMLIN, *Primary Examiner.*

WILLIAM FELDMAN, *Examiner.*